United States Patent [19]
Barkan et al.

[11] Patent Number: 6,014,471
[45] Date of Patent: Jan. 11, 2000

[54] APPARATUS AND METHOD FOR RETOUCHING A DIGITAL REPRESENTATION OF A COLOR IMAGE

[75] Inventors: Stanley Barkan, Hof Hacarmel; Vladimir Kaplan, Tel Aviv; Haim Zvi Melman, Kfar Saba, all of Israel

[73] Assignee: Scitex Corporation, Herzelia, Israel

[21] Appl. No.: 08/925,303

[22] Filed: Sep. 8, 1997

[30] Foreign Application Priority Data

Sep. 8, 1996 [IL] Israel ......................................... 119221

[51] Int. Cl.⁷ .............................. G06K 9/40; G06K 9/46; G06K 9/56; H04N 1/405
[52] U.S. Cl. ......................... 382/275; 382/254; 382/190; 382/205; 382/308; 358/447; 358/463; 358/531
[58] Field of Search ...................... 382/275, 254, 382/274, 276, 308, 305, 300, 298, 299, 282, 205, 195, 190; 358/525, 531, 538, 466, 428, 452, 447, 463

[56] References Cited

U.S. PATENT DOCUMENTS

| | | | |
|---|---|---|---|
| 4,484,230 | 11/1984 | Pugsley | 358/447 |
| 5,036,405 | 7/1991 | Kojima . | |
| 5,555,194 | 9/1996 | Cok | 382/254 |
| 5,598,226 | 1/1997 | Kokaram | 382/274 |
| 5,623,558 | 4/1997 | Billawala et al. | 382/254 |
| 5,832,140 | 11/1998 | Stapleton et al. | 382/298 |

FOREIGN PATENT DOCUMENTS

| | | |
|---|---|---|
| 0 585 759 | 3/1994 | European Pat. Off. . |
| 0 772 157 | 5/1997 | European Pat. Off. . |

OTHER PUBLICATIONS

Addison Wesley, (1992) *Computer Manual—Inside Macintosh Apple Computer.*

Martin D. Levine *Vision in Man and Machine*, McGraw–Hill, New York, 1985, pp. 359–360.

Anil K. Jain, *Fundamentals of Digital Image Processing*, Prentice–Hall, Inc., New Jersey, 1989, pp. 409–410.

Luc Vincent et al. *Morphological Segmentation for Textures and Particles in Digital Image Processing Method*, Marcel Dekker Inc., New York, 1994, pp. 43–102.

Mendel, J.M. *Fuzzy Logic Systems for Engineering: A Tutorial*, Proceedings of the IEEE, vol. 83, No. 3, Mar. 1995, pp. 345–377.

*Primary Examiner*—Scott Rogers
*Attorney, Agent, or Firm*—Darby & Darby

[57] ABSTRACT

Apparatus and a method for semi-automatic retouching of digital images is provided. The method includes the steps of processing the digital image to obtain a list of candidate defect segments, computing statistics for a list of candidate defect segments and for the segments of the image surrounding the candidate defect segments, selecting a sublist of defect segments in accordance with pre-determined criteria using the computed statistics, displaying the image together with the sublist and amending the values of the sublist of defect segments to obtain a retouched image.

24 Claims, 10 Drawing Sheets

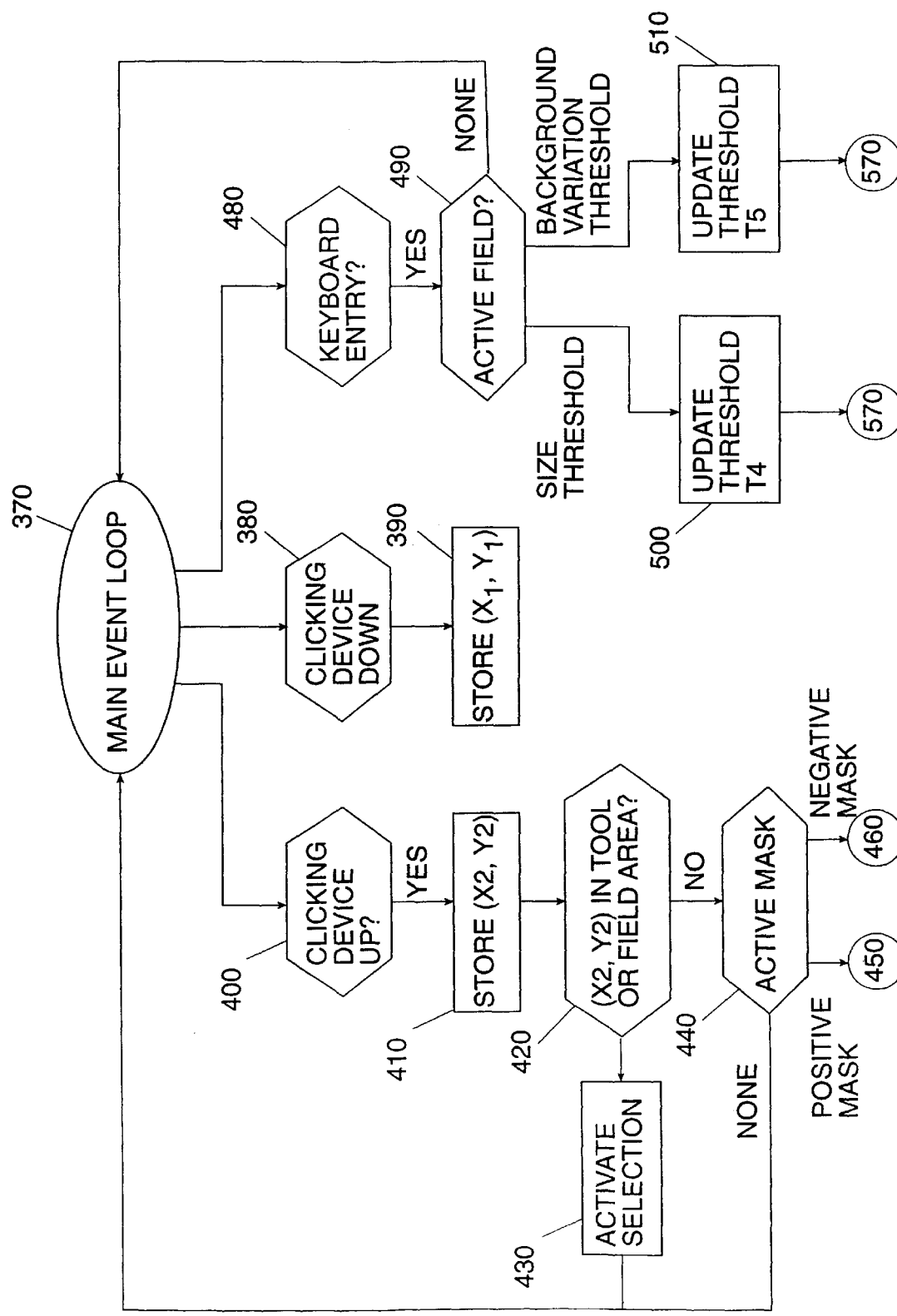
FIG. 7/1

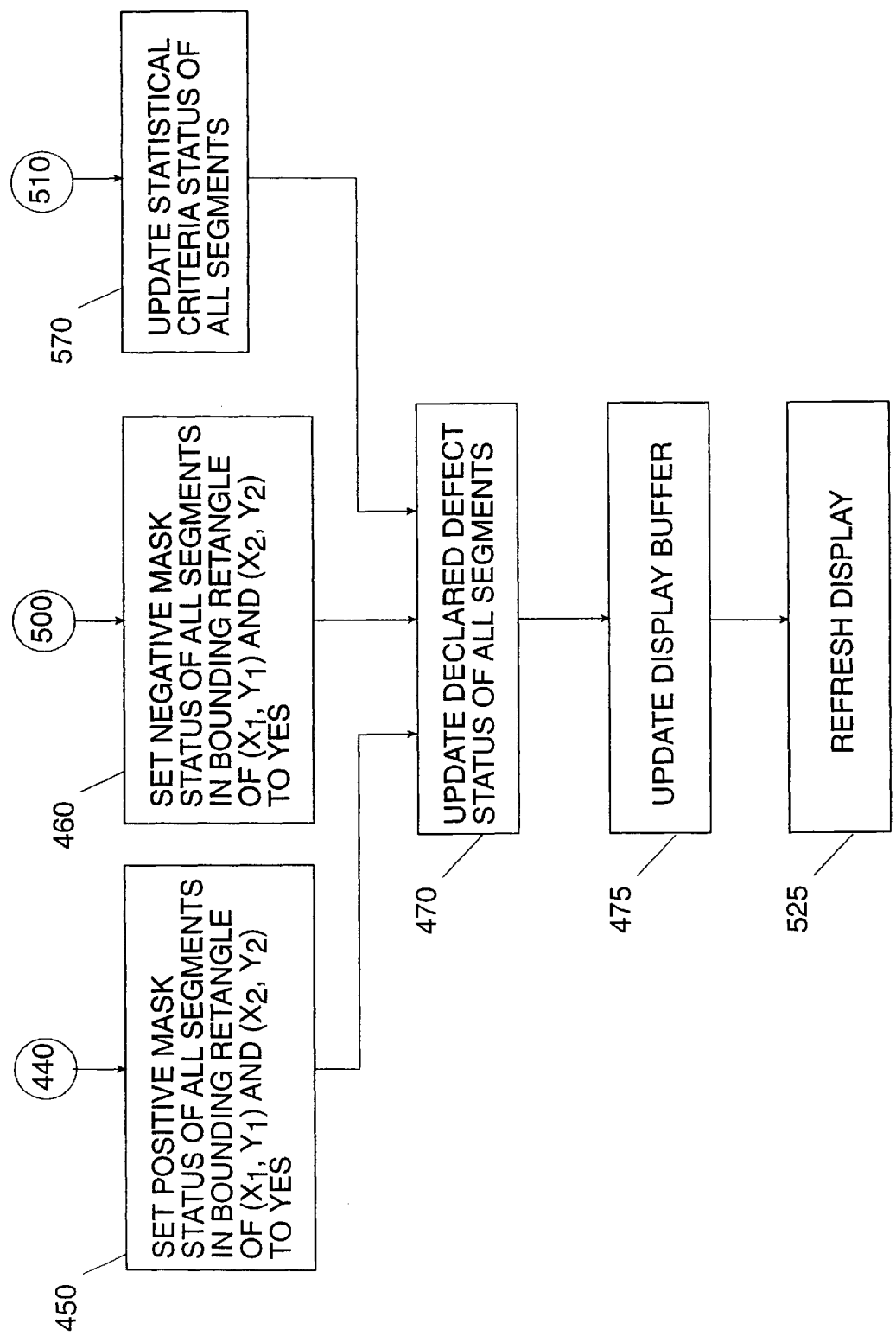
FIG. 7/2

APPARATUS AND METHOD FOR RETOUCHING A DIGITAL REPRESENTATION OF A COLOR IMAGE

FIELD OF THE INVENTION

The present invention relates to the digital retouching of scanned originals stored on a digital storage medium.

BACKGROUND OF THE INVENTION

One essential task in the reproduction of color images is retouching the image after it has been scanned to a digital storage medium by means of a scanning device such as the Scitex Smart 342L Scanner, manufactured by Scitex Corporation of Herzlia, Israel. Retouching is a process for digitally correcting defects in the image caused by scratches in the original or dust, hairs and other particles that have adhered to the original or to the scanning device prior to scanning. The most popular method of retouching is by interactive manual means with the aid of a computer processor, a monitor display, an electronic pointing and clocking device such as a mouse connected on a bus to the computer processor and a suitable software program. In this method, the image is displayed on the monitor and the operator uses the pointing and clicking device to select non-defective pixels from an area adjacent to the defective pixels, said area being of similar color and similarly textured to the defective area in the uncorrupted original. The non-defective pixels are copied over the defective pixels by the software program. The corrected image is then stored in place of the original on the digital storage medium. The disadvantages of this method are the length of time required to perform it and the fact that it often requires a skilled operator. All areas of the image have to be closely inspected in the search for defects and the selection of non-defective pixels to be copied over defective pixels must be skillfully made in order to maintain a natural appearance after correction of the defect.

Another method of retouching is by use of a digital filter such as the "dust and Scratches" filter to be found in the software program "Photoshop 3.0", marketed by Adobe, Inc, of Mountain View, Calif., USA. This program enables the operator to select an area to be corrected and to automatically retouch objects in the selected area which are narrower than an operator selected radius and of greater contrast from their surrounding than an operator selected threshold. Objects satisfying the thresholds are given new color values taken from the surrounding area. One disadvantage of this method is that a connected object may be partially retouched at its narrowest point and left defective at its widest point. Another disadvantage is that objects slightly larger than the selected radius may be partially retouched around their circumference and thereby made thinner. Yet another disadvantage of this method is the difficulty of guarding actual scene objects satisfying the thresholds against undesired retouching. The operator has to guess in advance all objects that may be unwillingly retouched in order to deselect the area including them or else he has to undo the already performed retouch corrections.

U.S. Pat. No. 4,484,230 discloses an image reproduction method and apparatus in which areas in the image are marked either by fluorescent marking on the original or by digital means on a representation of the image on a monitor, and the defects contained in the marked areas are detected and corrected during final image reproduction. Detected defects cannot be examined and authorized by the operator because detection and correction of defects are effected simultaneously during the scanning process. The operator must successfully indicate all defect areas in advance by inspection of the image and cannot correct errors without rescanning the original. Defects are treated on a pixel by pixel basis and at no stage are they linked into connected segments for treatment as distinct objects.

In most cases, no set of parameters perfectly separates defects from similar, real image elements. This results both in false correction of image elements and in missed correction of defects.

SUMMARY OF THE INVENTION

It is the purpose of the present invention to provide the operator with a fast and simple means for retouching digital images which will eliminate the process of manually searching for defects by locating and displaying to the operator all image segments suspected of being defects.

It is a further purpose of the present invention to provide the operator with a fast and simple means for approving or reject suspected image segments for later automatic defect retouching.

It is a yet further purpose of the present invention to provide automatic defect correction that will not leave visible traces in the image.

It is a particular characteristic of the present invention that the defect identification step can be separated from the defect retouching step so that the operator can approve or reject candidate defects for retouching in an efficient manner.

Thus, there is provided in accordance with a preferred embodiment of the invention, a method for semi-automatic retouching of digital images. The method includes the steps of:

processing the digital image to obtain a list of candidate defect segments;

computing statistics for the list of candidate defect segments and for the segments of the image surrounding the candidate defect segments;

selecting a sublist of defect segments in accordance with pre-determined criteria using the computed statistics;

displaying the image together with the sublist; and amending the values of the sublist of defect segments.

Furthermore, in accordance with a preferred embodiment of the invention, the method further includes the step of storing the retouched image.

Furthermore, in accordance with a preferred embodiment of the invention, the list of candidate defect segments are connected.

In addition, in accordance with a preferred embodiment of the invention, the step of processing includes the step of using a contrast box filter.

Furthermore, in accordance with a preferred embodiment of the invention, the step of displaying the image includes the steps of:

dividing the image into several subimages; and displaying the subimages containing declared defective segments in successive order.

In addition, in accordance with a preferred embodiment of the invention, the step of amending includes the step of an operator choosing a final list of declared defect segments.

Furthermore, in accordance with a preferred embodiment of the invention, the step of choosing includes any or all of the following steps, performed by an operator:

modifying the criteria, selecting negative mask areas and excluding the candidate defect segments in the sublist, or selecting positive mask areas and including the candidate defect segments in the sublist.

In addition, in accordance with a preferred embodiment of the invention, the step of amending also includes the step of viewing the modified sublist, performing further corrections and adding new candidate defect segments to said sublist.

Furthermore, in accordance with a preferred embodiment of the invention, the step of amending further includes the step of automatically retouching the sublist of defect segments and/or the final list of declared defect segments. The step of retouching includes the step of changing the values of pixels within the defect segment with the values of pixels from the segments of the image surrounding the defect segment.

Furthermore, in accordance with a preferred embodiment of the invention, the step of processing the digital image is performed using morphological methods. Alternatively, the step of processing the digital image is performed for either light segments on a dark background, dark segments on a light background or both light and dark segments on a dark or light background respectively.

Additionally, in accordance with a preferred embodiment of the invention, the step of processing the digital image is performed a second time during the step of selecting positive mask areas.

Furthermore, in accordance with a preferred embodiment of the invention, the step of automatically retouching includes the steps of:

performing a first retouching after the selecting step;

storing the resulting initial retouched image; and performing a second retouching step after a final list of declared defect segments has been chosen.

The second retouching step includes retouching the segments on both the sublist and final list by copying corresponding retouched areas from the stored initial retouched image.

Additionally, there is also provided in accordance with a preferred embodiment of the invention, apparatus for the semi-automatic retouching of digital images. The apparatus includes processing means for processing the digitally stored image to obtain a list of candidate defect segments, means for computing the statistics of the candidate defect segments and the segments of the image surrounding the candidate defect segments, storage means coupled to the processing means for storing the digital images and the list, display apparatus coupled to the processing means for displaying the stored image and the defect segments.

Furthermore, in accordance with a preferred embodiment of the invention, the apparatus further includes a display buffer coupled to the display apparatus and to the processing means for storing the digital image and the pixels of the defect segments in a raster image form.

Finally, in accordance with a preferred embodiment of the invention, the apparatus further includes interactive tools coupled to the processing means with which an operator can select and/or change the pre-determined criteria thresholds. The apparatus also includes masking tools coupled to the processing means with which an operator can select positive and negative masking areas in the image. The apparatus also includes means for changing the values of pixels within the defect segment with the values of pixels from the segments of the image surrounding the defect segment.

BRIEF DESCRIPTION OF THE DRAWINGS

The present invention will be understood and appreciated more fully from the following detailed description taken in conjunction with the drawings in which:

FIG. 7 is a simplified flow chart diagram of the method for interactively changing the statistical criteria thresholds and the manual mask data of candidate defect segments.

DETAILED DESCRIPTION OF THE PRESENT INVENTION

Figure 1:
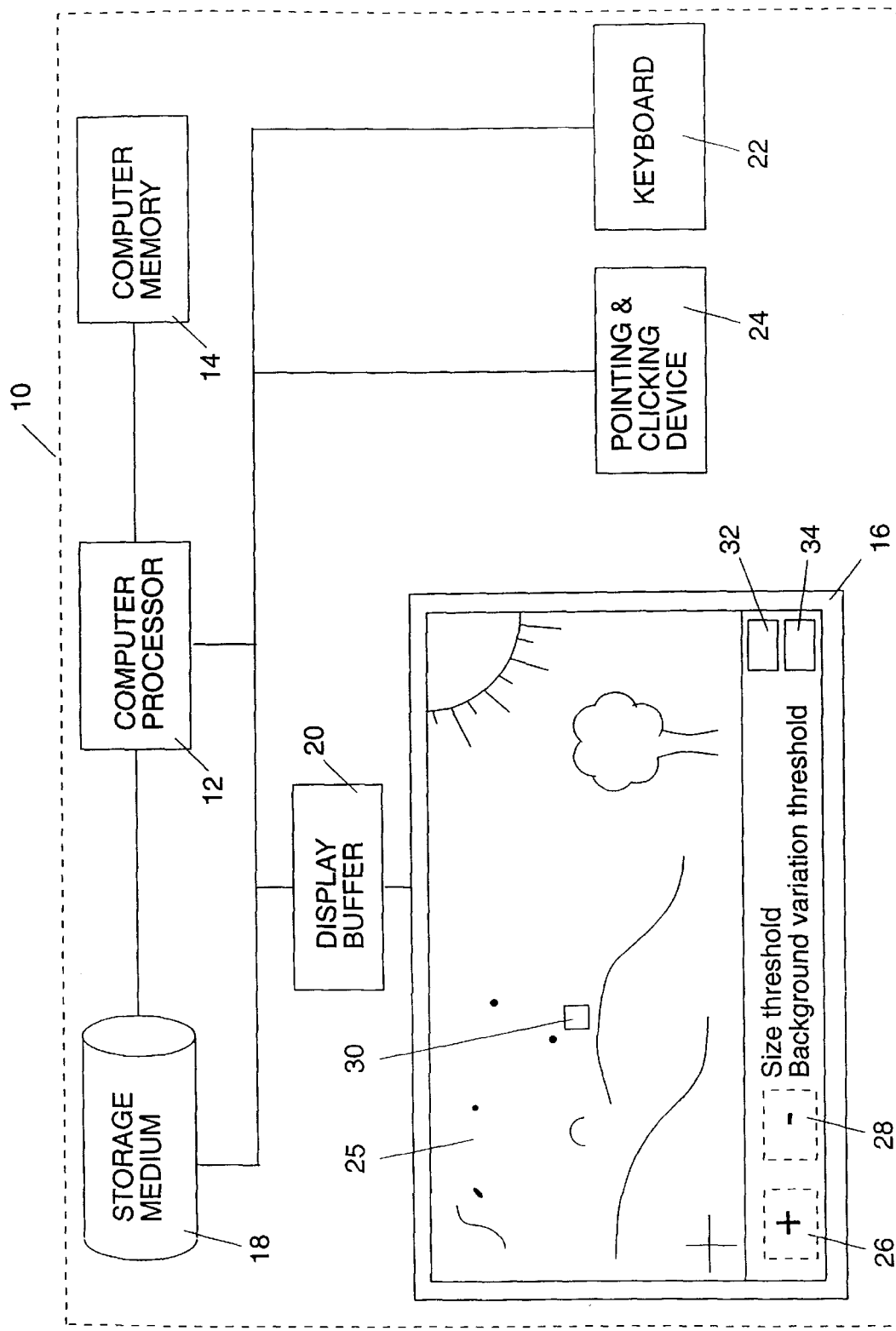
FIG. 1 is a schematic illustration of apparatus required to interactively change the statistical criteria thresholds and the manual mask data of candidate defect segments in accordance with a preferred embodiment of the present invention.

Reference is made to FIG. 1, which is a schematic illustration of the apparatus useful for semi-automatic retouching of digitally stored scanned originals, in accordance with a preferred embodiment of the invention.

The apparatus comprises a computer system, generally designated 10 comprising a computer processor 12 with memory 14 linked to a monitor 18 and a long-term storage medium 18. In addition, the computer system comprises a display buffer 20 for storing the display data from the monitor 18, and standard computer peripherals such as a keyboard 22 and a pointing and clicking device (such as a 'mouse') 24. The various components of the computer system 10 are any standard commercially available components.

Monitor 16 is a standard display screen, or similar, for displaying the image, generally designated 25, being examined. Also illustrated are a candidate defect segment, referenced 30 and interactive tools 26 and 28 for changing the statistical criteria thresholds and the manual mask data of the candidate defect segments (numerical fields 32 and 34). Candidate defect segments may be defined as segments of a digital image which may have defects and are possibly candidates for retouching.

Interactive tools 26 and 28 are used to select positive and negative mask areas respectively, and numerical fields 32 and 34 which indicate the size threshold of the defect segment and background variation threshold, respectively.

Long-term storage medium 18, is any suitable storage medium, such as a hard disk, for storing data including original and retouched image data and the list of candidate defect segments, for example. Computer processor 12 may be any computer processing unit for computing candidate defect segments and their statistics and computing new pixel values. Computer memory 14 is utilized, inter alia, for storing the list of candidate defect segments while interactive operator corrections are being performed.

Display buffer 20 contains the original image and the declared defect segments' pixels in a raster image form.

Candidate defect segments may be clearly marked by displaying a combination of the two raster images such that at the location of the defect, the pixel values of the image are replaced by values of a constant bright color such as bright red, bright green or bright blue.

Pointing and clicking device 24 may be used to select interactive tools 26 and 28, or to activate numerical fields 32 and 34, by pointing to the desired tool or field, depressing the clicking device and releasing it. When a mask tool is active, the selection of a mask area may be performed by pointing to a top left corner of the desired mask area, depressing the clicking device, pointing to the bottom right corner of the desired mark area and releasing the clicking device. Such methods for interactive selection and data entry by means of a pointing and clicking device are described in computer manuals such as Inside Macintosh, ©Apple Computer, Inc., Addison Wesley, Reading Mass., 1992.

It will be appreciated by persons familiar with the art that the apparatus described with reference to FIG. 1 may be replaced by functional equivalents. For example, the pointing device may be a trackball and the clicking device a key from the keyboard 22, a pen or a pressure sensitive tablet. The display may be a projected display rather than a monitor. Other utility tools may be provided such as enabling the operator to select the desired marking color to switch the declared defect segment markers on and off.

Figure 2:
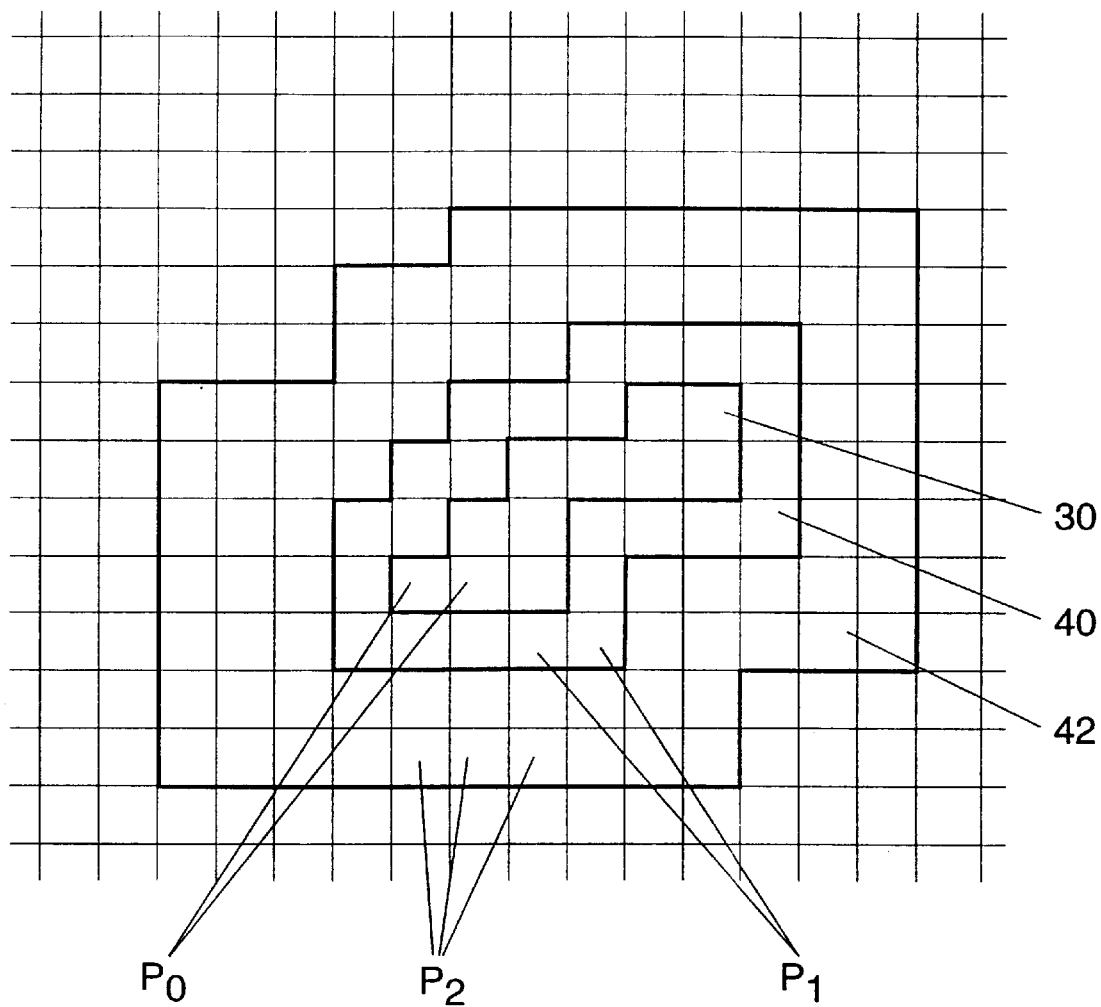
FIG. 2 is a schematic illustration of a candidate defect segment and its surrounding area.

Reference is now made to FIG. 2 which is an enlarged illustration of a candidate defect segment 30 comprising a plurality of connected pixels, generally referenced $P_0$. Segment 30 is immediately surrounded by an enclosing area 40, for example, one pixel wide. Each pixel within area is referenced $P_0$. Enclosing area 40 is itself surrounding by a secondary area 42, two pixels wide, for example (each pixel within area is referenced $P_0$). Enclosing area 40 and secondary area 42 together comprise the background to segment 30.

It will be appreciated that enclosing area 40 and secondary area 42 may be larger or smaller to facilitate the retouching of defects in images of different scales and underlying textures.

In a preferred embodiment, the automatic retouching of the final sub-list of declared defect segments 30 is preferably performed by replacing each pixel $P_0$ within segment 30 by its nearest neighbor (pixels $P_2$) from area 42.

In an alternative embodiment, defect pixel color values may be replaced by the average of two nearest neighboring pixels' color values found in area 42 in opposite directions. In another embodiment, the replaced pixel's color value may be slightly altered by adding random noise of a level matching the statistical variation computed in area 42, as described below with reference to FIG. 5.

It will be appreciated by persons familiar with the art that the method of retouching need not be restricted to the methods described above with reference to FIG. 2 but may include other methods such as replicating neighboring hue and saturation values in the replaced pixel but adding noise to the luminance of the replaced pixel or copying an entire neighboring area (not overlapping areas 30 and 40) on to areas 30 and 40.

Figure 3A:
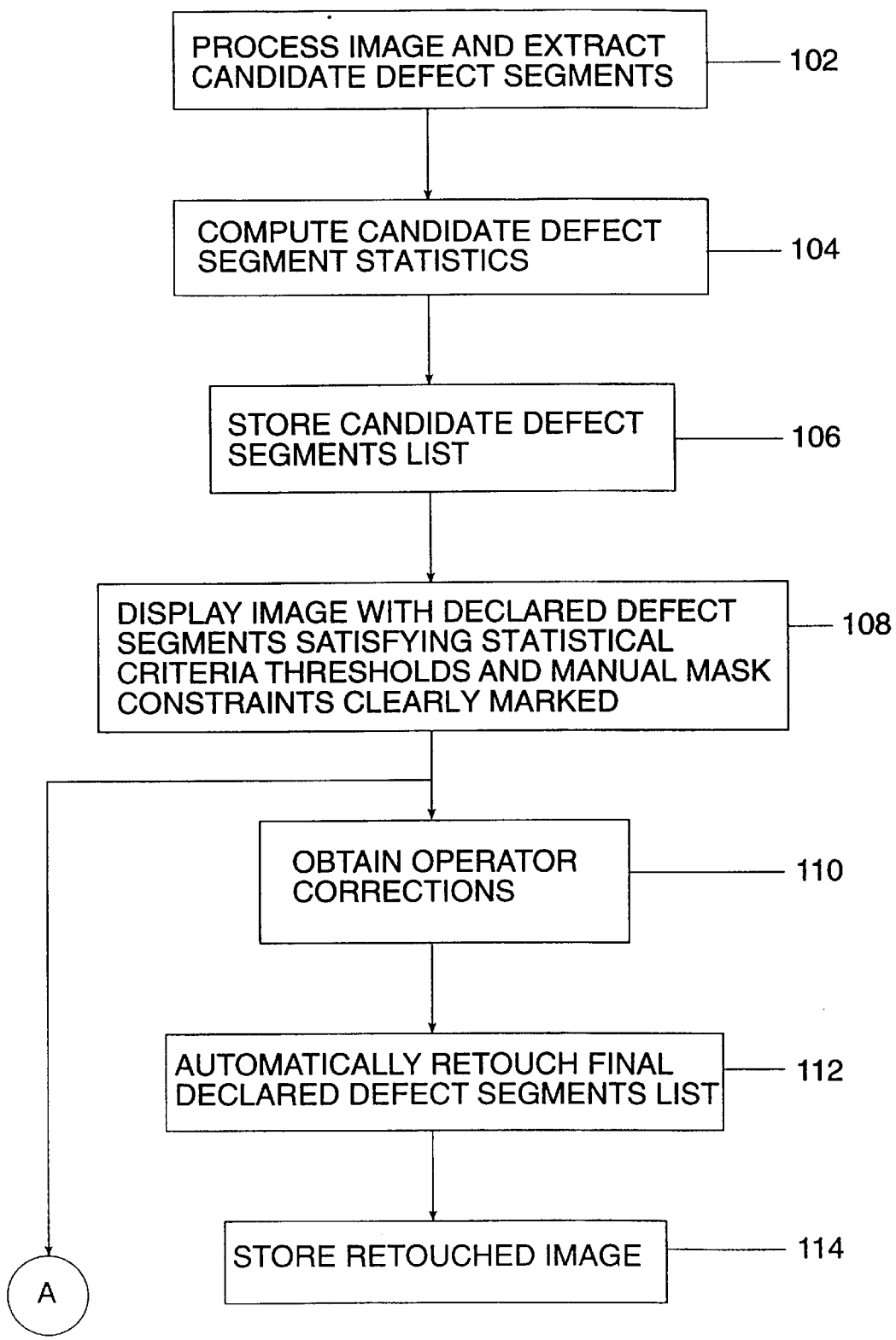
FIGS. 3A and 3B are a flow chart illustration of a method for semi-automatic retouching of digitally stored scanned originals in accordance with a preferred embodiment of the present invention.
Figure 3B:
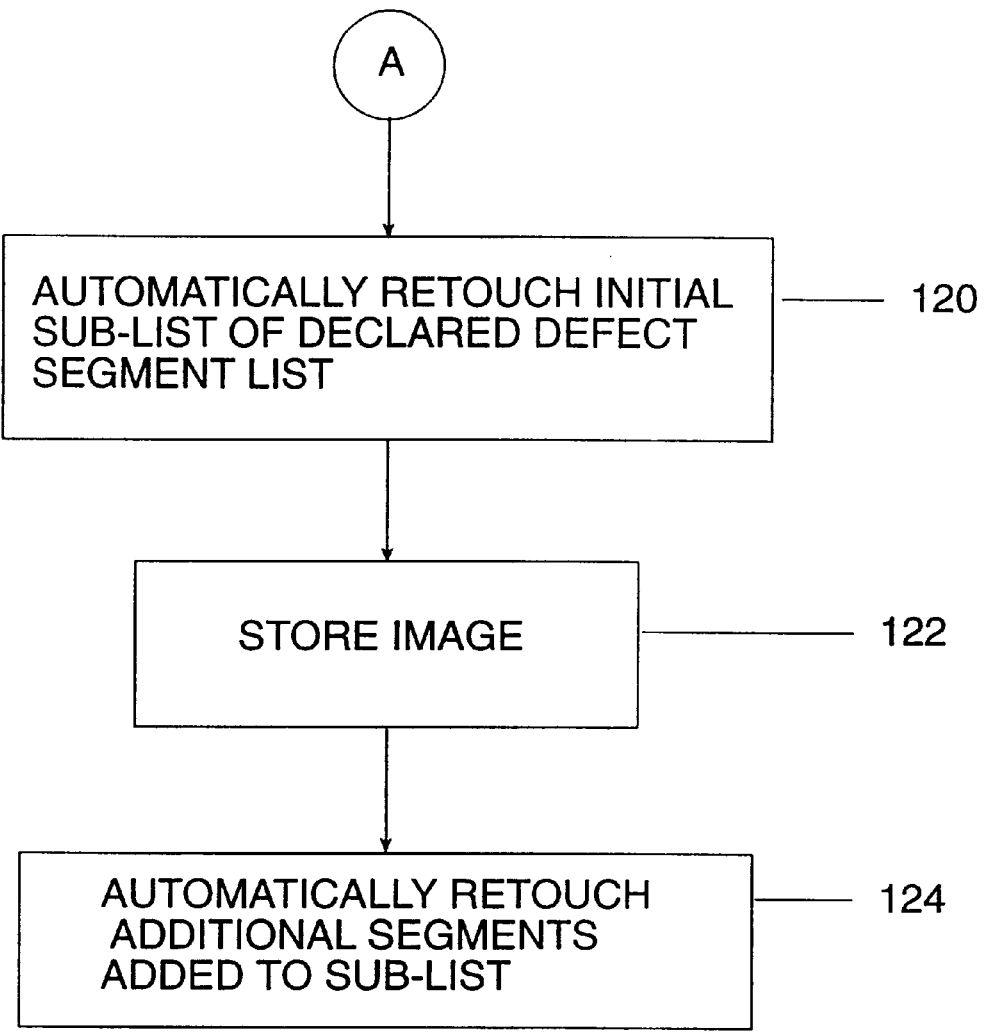

Reference is now made to FIG. 3, which is a flow chart illustration of a method for semi-automatic retouching of digitally stored scanned originals, in accordance with a preferred embodiment of the invention.

The stored image is processed by the computer processor 12, preferably by an off-line batch process, and an exhaustive list of candidate defect segments is extracted (step 102), as will be described hereinbelow, with reference to FIGS. 4 and 5. Care is taken to include any segment which however slightly is suspected of being a defect.

In step 104, statistics are computed for candidate image segments from the segments and their surrounding areas, as will be described below with reference to FIG. 4, preferably also by the off-line batch process. In step 106 the candidate defect list is stored, either in long term digital storage 18 (if an off-line batch process has been performed), or in the computer memory 14 for immediate interactive use, if an interactive process has been performed for steps 102 and 106.

The image 30 is then displayed on a monitor with the initial sublist of declared defect segments satisfying the statistical criteria thresholds 32 and the manual mask constraints 34 clearly marked (step 108). In step 108, the segments least likely to be defects are not shown so as not to overwhelm the operator with too much information.

In one embodiment, corrections are obtained from the operator (described hereinbelow with reference to FIGS. 7 and 8)—step 110. The final sublist of declared defect segments is automatically retouched as described hereinabove with reference to FIG. 2 (step 112), and the retouched image is stored in long term digital storage 18 (step 114).

Alternatively, after step 108 has been completed, the initial sublist of declared defect segments is automatically retouched (step 120) and the resulting initial retouched image is stored (step 122). Subsequently, only segments added to the initial sublist of declared defect segments are automatically retouched (step 124) by the method described hereinabove, with reference to FIG. 1. Declared defect segments that were present on the initial sublist of declared defect segments are retouched by copying the corresponding areas from the stored initial retouched image.

Figure 4:
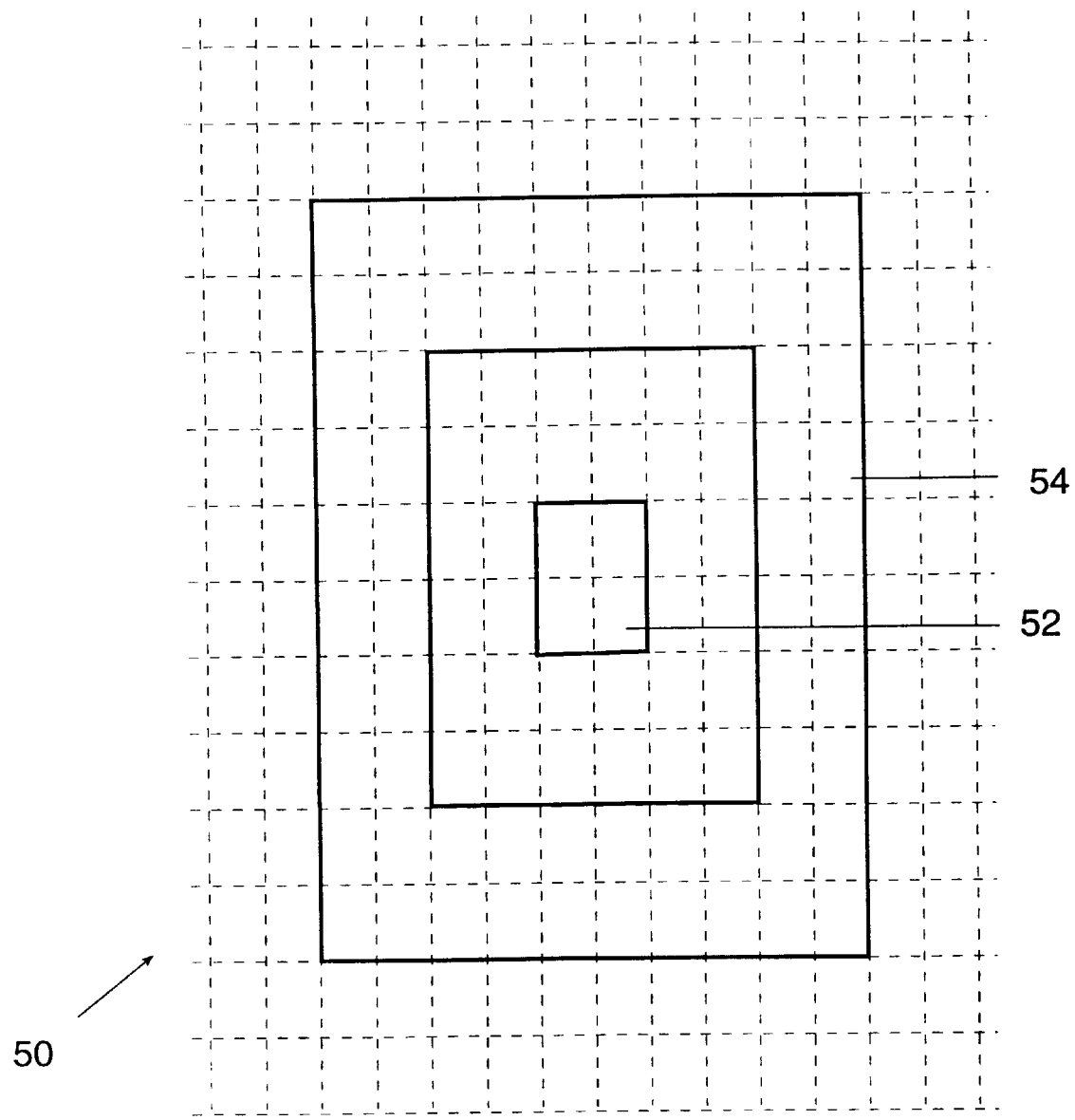
FIG. 4 is a schematic illustration of a contrast-box filter used to detect candidate defective pixels.

Reference is now made to FIG. 4, which is a schematic illustration of a contrast-box filter, generally designated 50, used in the preferred embodiment of the present invention to detect candidate defective pixels. Contrast-box filter 50 comprises an inner box 52, having a size of 1×1, 3×3, or 5×5 pixels, surrounded by an outer perimeter 54 of two pixels width and distant one or two pixels from the perimeter of the inner box. By comparison with the statistics computed from pixels in the inner box 52 and statistics computed from pixels in the outer perimeter 52, candidate defects may be identified (as will be described hereinbelow with reference to the flow chart of FIG. 5).

It will appreciated, by persons familiar with the art, that the contrast box filter 50 need not be restricted to square shapes with an odd number of pixels along each side but may be any shape including rectangular, approximately circular or even irregularly shaped. The outer perimeter 54 may be larger or smaller than two pixels in width and placed further or nearer to the inner box 52, in accordance with the nature of the defects and the images being processed.

Figure 5:
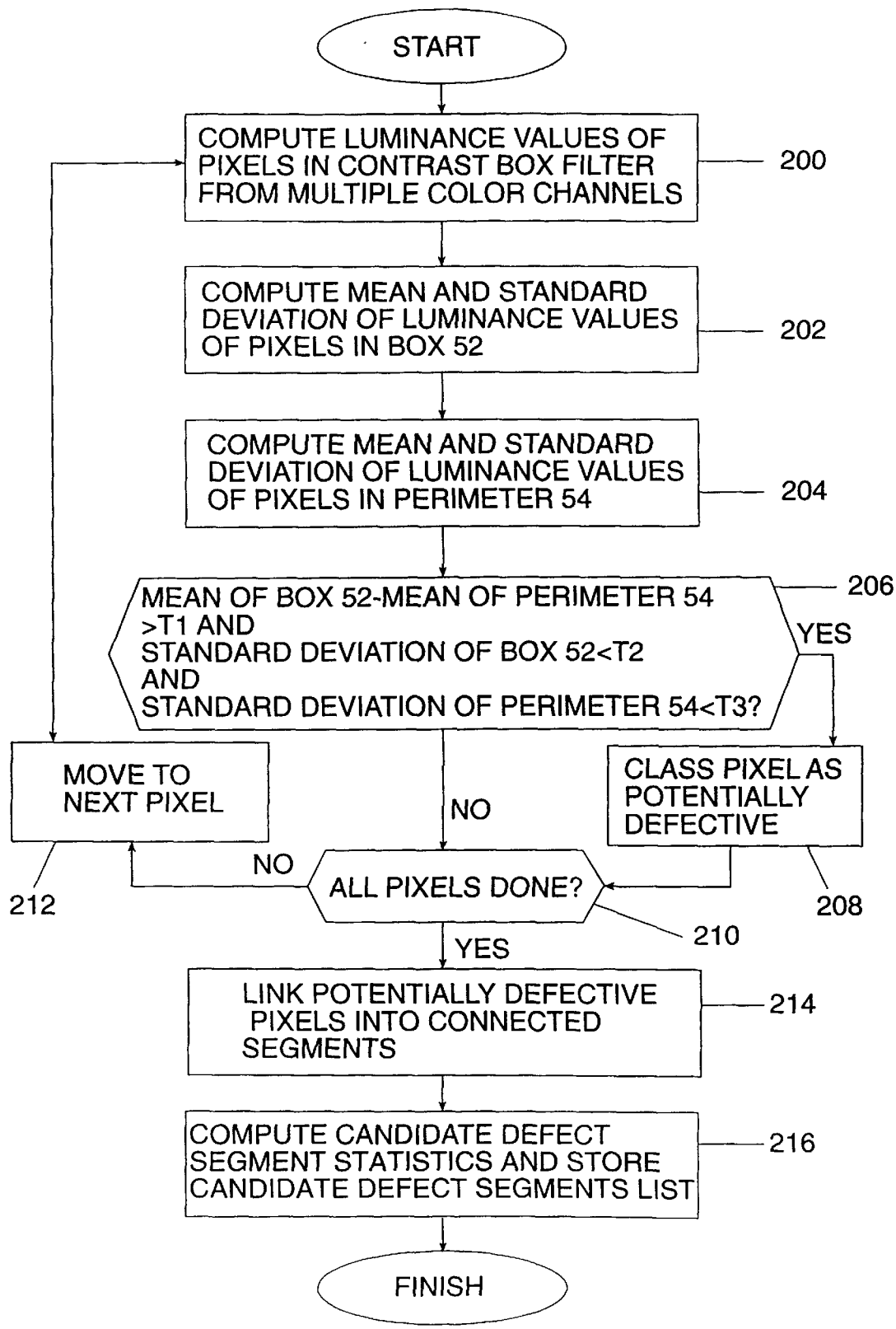
FIG. 5 is an example of an entry in the candidate defect segment list.

Reference is now made to FIG. 5 which is a flow chart illustration of a method for extracting an exhaustive list of candidate defect segments in accordance with a preferred embodiment of the present invention. Each pixel in the image 30 is successively processed by centering the contrast box filter 50 on the pixel and computing its qualities, as follows:

In step 200, a single channel luminance value is computed for all pixels in the contrast box filter 50 from the multiple color channel values, preferably but not restricted to a simple average of all channels. It will be appreciated by persons familiar with the art, that other values such as hue and saturation values may be computed by methods such as those described in pages 359–360 of *Vision in Man and Machine,* by Levine, M. D. published by McGraw Hill, New York, 1985, for use instead of, or in addition to the luminance values.

The mean and standard deviation of the luminance of pixels in the inner box 52 are computed (step 202). Then, the mean and standard deviation of luminance of pixels in the outer perimeter 54 are computed (step 204). The difference of the computed means is then compared to a threshold value T1, the standard deviation of the pixels in box 52 is compared to a threshold T2 and the standard deviation of the pixels in perimeter 54 is compared to a threshold T3 (query box and step 206).

If the difference of means is greater than T1 and the respective standard deviations are less than T2 and T3, the pixel is classed as a potentially defective pixel (208). Query box 210 determines whether to continue.

The process is continued until all the pixels have been processed by moving to the next pixel (step 212) and repeating steps 202 to 210.

Once all pixels have been processed, the defective pixels are linked into connected segments (step 214) by a linking method such as that described in pages 409–410 of *Fundamentals of Digital Image Processing*, by Jain, A. K., published by Prentice Hall, New Jersey, 1989. The connected segments comprise the list of candidate defect segments.

The statistics are then computed for each candidate defect segment and the list of candidate defect segments is stored on the digital storage medium (step 216). The statistics preferably include but are not restricted to the size of the segment measured in number of connected pixels and the statistical variation of the background (described hereinbelow with reference to FIG. 6).

In the method described above, both light defects on a dark background and dark defects on a light background are detected. In another embodiment of the present invention either light defects on a dark background or dark defects on a light background or both may be detected depending on an operator choice or a characteristic of the original image. For example, dark defects on a light background may be detected for originals that were positive transparencies and light defects on a dark background may be detected for negative originals. Both light and dark defects may be detected for originals scanned by reflective light.

It will be appreciated by persons familiar with the art that the method for extracting an exhaustive list of candidate defect segments need not be restricted to the method hereinabove described. Morphological methods such as those described in the article *Morphological Segmentation for Textures and Particles in Digital Image Processing Methods*, by Vincent, L. and Dougherty E. R., pages 43–102, Editor Dougherty E. R. Marcel Dekker, Inc., New York, 1994, or other detection and linking methods may be used instead of the methods hereinabove described.

Figure 6:
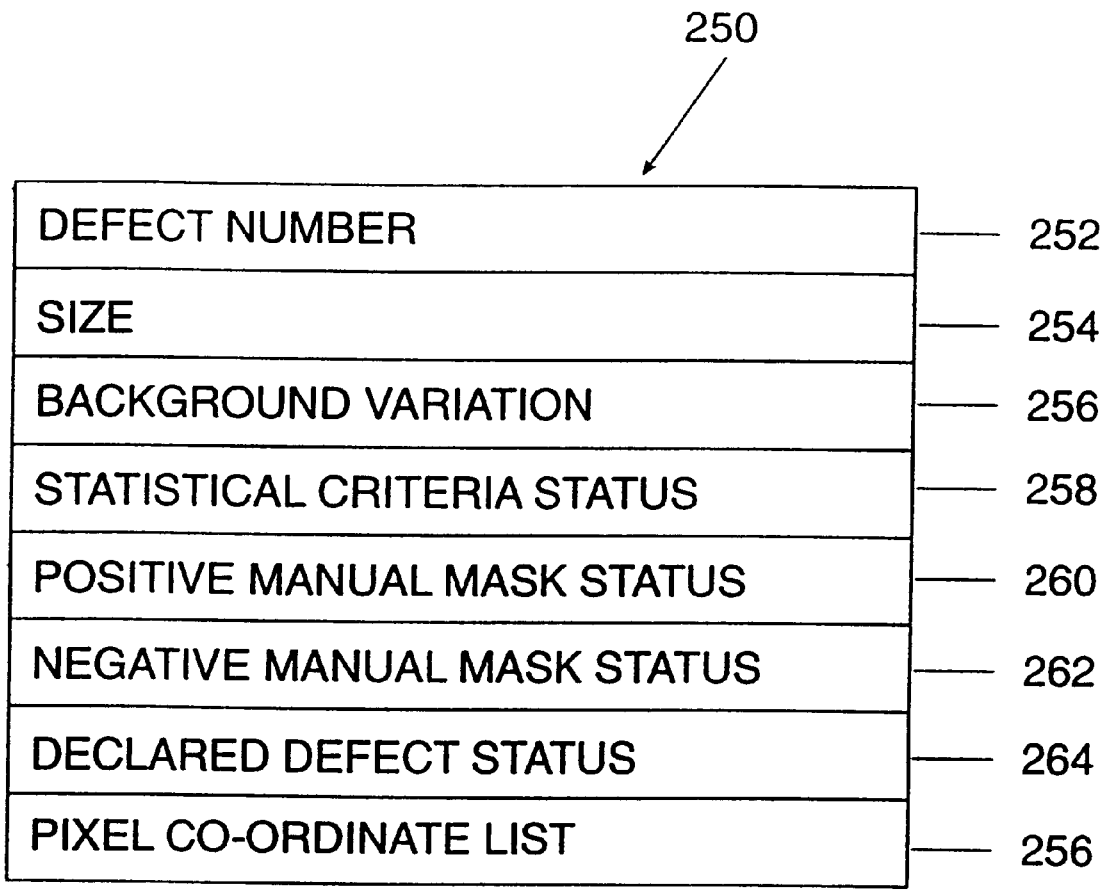
FIG. 6 is a flow chart illustration of a method for extracting an exhaustive list of candidate defect segments.

Reference is now made to FIG. 6 which is an example of an entry in the candidate defect segment list, referenced 250, comprising data items computed for each candidate defect segment in accordance with a preferred embodiment of the present invention. The list 250 includes an identifying candidate defect number (252), the size of the connected segment (254), the background variation (256), the statistical criteria status (258), the positive and negative mask status, (260 and 262, respectively), the declared detect status (264) and the pixel coordinate list (266).

The size of the connected segment (254) is measured as the number of connected pixels. The statistical variation (256) of the combined background areas 52 and 54 is measured by the standard deviation of their luminance values. The statistical criteria status (258) is stored as PASS if the candidate defect segment size (254) is smaller than a threshold T4 and candidate defect segment background variation (256)is smaller than a threshold T5, where the thresholds T4 and T5 are determined either by default values or by the operator, (described hereinbelow with reference to FIGS. 7 and 8. If the statistical criteria status (258) of a candidate defect segment is not stored as PASS, then it is stored as FAIL.

Items 260 and 262 signify whether the candidate defect segment is included in a negative or positive mask area determined by the operator or by the program (as described below with reference to FIGS. 7 and 8). Item 264 is the declared defect status of the candidate defect segment, stored as YES if the statistical criteria status is PASS and the defective segment is not in a negative mask area, or if the candidate defect segment is in a positive mask area. If the declared defect status of a candidate defect segment is not YES then it is stored as NO. Item 266 is the list of co-ordinates of pixels included in the connected candidate defect segment 30.

It will be appreciated by persons familiar with the art that the statistics for deciding whether a candidate defect segment is to have a statistical criteria status of PASS or FAIL need not be restricted to the above-mentioned specific statistics, but may be other quantities computed from pixels in or surrounding the candidate defective segment, in a luminance channel or in other color channels such as, for example, the hue range of segment 30 or a measure of linearity of segment 30, where large hue range or large linearity contribute to a statistical criteria status of FAIL.

It will further be appreciated by persons familiar with the art that the rule for deciding whether the declared defect status of a condidate defect segment is to be YES or NO need not be on the basis of a combination of sharp thresholds but may be a rule based on fuzzy criteria, using the technique of fuzzy logic as described in *Fuzzy Logic Systems for Engineering: A Tutorial*, by Mendel, J. M., Proceedings of the IEEE, Vol. 83, No. 3., March 1995, pages 345–377.

Reference is now made to FIG. 7 which is a flow chart diagram of the method for interactively changing the statistical criteria thresholds and the manual mask data of candidate defect segments. The method is event-driven in the sense described in page 71 of *Inside Macintosh*, ©Apple Computer, Inc., Addison Wesley, Reading Mass., 1992.

In step 370, the current event is detected and identified as a clicking device down (step 380) or as a clicking device up event (step 400).

If clicking device down (step 380) is detected, the pointing location is stored as (x1,y1)—step 390, and control is returned to main event loop 370.

If a clicking device up event is identified (step 400), the pointing location is stored as (x2,y2)—step 410. Query box 420 then determines whether the location (x2,y2) is identified as falling in a tool area 26 or 28 or in a numeric field area 32 or 34. If yes, the selected tool or numeric field is activated (step 430) and control is returned to main event loop 370. If not, the mask activation status is identified (query box 440).

If a mask is not active, control is returned to main event loop 370. If the positive mask is active, in step 450 the positive mask status of all segments wholly included in the bounding rectangle of (x1,y1) and (x2,y2) is updated to YES. If the negative mask is active, in step 460 the negative mask status of all segments wholly included in the bounding rectangle of (x1,y1) and (x2,y2) is updated to YES.

From steps 450 or 460, control is passed to update step 470 in which the declared defect status of all candidate segments is updated (as described below with reference to FIG. 8).

If, in step 370, the current event is detected and identified as keyboard entry event (step 480), the active field status is identified (step 490). If a field is not active, control is returned to main event loop 370. If the size threshold field 32 is active, threshold T4 is updated in step 500. If the background variation threshold field 34 is active, threshold T5 is updated in step 510.

From steps 500 or 510, control is passed to update step 520 in which the statistical criteria status of all candidate dust segments is updated. For each segment, if size 254 is smaller than threshold T4 and background variation 256 is smaller than threshold T5 the statistical criteria status of the segment is set to PASS. Else it is set to FAIL.

From step 520 control is passed to step 470 in which the declared defect status of all candidate defect segments is updated as described below with reference to FIG. 8.

After step 470, the display buffer is updated in step 475 by replacing the current raster image of the declared defect segments' pixels with the current raster image formed from the updated declared defect segments list and the display is refreshed in step 525.

In another embodiment of the present invention the step of extracting the exhaustive list of candidate defect segments described in detail with reference to FIG. 5 may be carried out for a second time online within areas selected by use of the positive mask as the areas are selected. This can save the storage space required to maintain the exhaustive list of candidate defect segments from the time of initial extraction to the time of interactive operator corrections. The online extraction of candidate defect segments may be carried out with different sized contrast boxes or with different thresholds to those described with reference to FIG. 5. For example, a larger contrast box filter may be used to detect larger than normal defects in case the operator selects an area of size smaller than a given threshold, in case the display zoom ratio is larger than a given threshold or if the operator repeatedly selects the same area. Since all candidate defect segments in positive mask areas are included in the sublist of declared defect segments, this enables the operator to further customize the list of declared defect segments.

It will be further appreciated that the width of correction area 40 surrounding the segments may be increased or decreased to improve the appearance of the final result.

It will be appreciated by persons familiar with the art that the graphical user interface of the preferred embodiment described above may be replaced by any functionally similar man-machine interface provided such an interface enables the entry of varying threshold data, the delineation of areas in the image to represent positive mask areas and negative mask areas and the clear display of marked defect segments. For example, in another embodiment the delineating tool may enable the operator to trace an arbitrary closed shape rather than a rectangle. The threshold data may be entered by manipulating a virtual graphic object such as a slider or by wielding a pressure-sensitive input device where additional pressure indicates a higher threshold. The defect segments displayed to the operator may be all the candidate segments or only those on the sublist of declared defect segments or any other sublist such as the segments satisfying the size threshold or any combination of sublists. The image may be displayed to the operator as a sequence of fixed size rectangular areas in all of which there are declared defect segments and excluding all rectangles in which there are not declared defect segments. The defect segments may be marked in alternative ways such as with check marks or dotted outlines or other visible signs.

Figure 8:
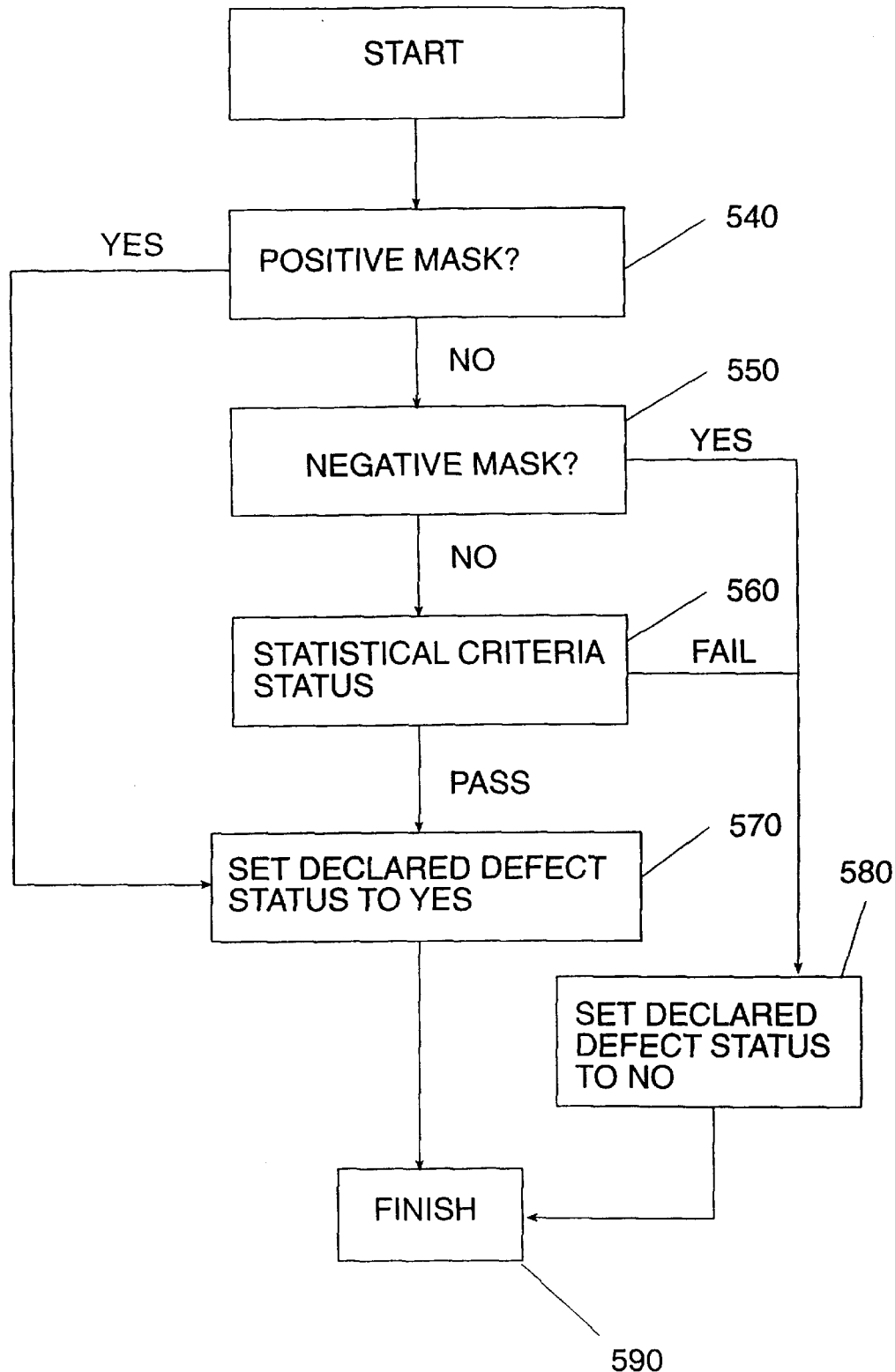
FIG. 8 is a simplified flow chart diagram of the method for updating the declared defect status of a candidate defect segment after changes made by the operator.

Reference is now made to FIG. 8, which is a flow chart illustration of a method for updating the declared defect status of a candidate defect segment after changes made by the operator. In step 530, the update is started on the current segment and the positive mask status of the segment is identified (query box 540).

If it is NO, the negative mask status of the segment is identified in step 550. If it is NO, the statistical criteria status of the segment is identified in step 560. If it is PASS, the declared defect status of the segment is set to YES in step 570.

If in step 540, the positive mask status of the segment is identified as YES, the declared defect status of the segment is set to YES in step 570. If in step 550 the negative mask status of the segment is identified as YES or in step 560 the statistical criteria status of the segment is identified as FAIL, the declared defect status of the segment is set to NO in step 580. From steps 570 or 580, control is passed to step 590 where the computation for the segment concludes.

In another embodiment of the invention, the operator may wish to examine the candidate defect segments 30 in full resolution on the display monitor 16. This requirement cannot generally be met since the size of the image 30 may be larger than the display size. In this embodiment, the image is divided into subimages, each subimage being the size of the display area. For example, if the display area is 350 by 300 pixels, this will be the size of each subimage. To save time, only subimages containing candidate defect pixels are displayed. For each subimage that is displayed the operator may correct the declared defect status of segments as described with reference to FIGS. 7 and 8 above.

The operator has the option at any time during the correction process of viewing the corrected subimage before moving onto the next subimage.

It will be appreciated by persons familiar with the art that the subimages do not have to be equal in size and that the display resolution may be selectable by the operator.

It will be appreciated by persons familiar with the art that the particular data format described with reference to FIG. 6 and the particular steps described in FIGS. 7 and 8 above are representative only of the preferred embodiment and that other data formats and sequences of actions resulting in similar computation and display of the declared defect segments are possible. For example, entries 254 to 266 in the candidate defect segments list may each be represented by a raster image layer in display buffer 20 such that the value of the data item for each segment is replicated to all pixels belonging to the segment. In this case, the computations of steps 520, 530 to 590 and 475 may be done on a pixel by pixel basis from raster data in the display buffer 20 and not on a segment by segment basis from the candidate segment list in the computer processor 12.

It will further be appreciated by persons familiar with the art that the method of the present invention is not restricted to scanned originals but may be applied to any digital image including, for example, images acquired by digital photographic means such as the DCB camera marketed by Leaf Input Systems of Boston, USA.

It will also be appreciated by persons skilled in the art that the present invention is not limited by what has been particularly shown and described herein above. Rather the scope of the invention is defined by the claims which follow:

We claim:

1. A method for retouching of digital images said digital images comprising digital image data, said method comprising the steps of:

electronically processing said digital image data to obtain a primary list of candidate defect segments, each segment comprising locations and values of one or more pixels;

computing statistics from values of pixels in said primary list of candidate defect segments and from values of pixels surrounding said candidate defect segments;

selecting a sublist, said sublist comprising one or more locations and values from said primary list of candidate defect segments, in accordance with pre-determined criteria using said computed statistics;

displaying said image together with said sublist;

creating an amended sublist by optionally adding members or removing members from said sublist; and electronically retouching said image data at said locations from said amended sublist and at locations surrounding said locations from said amended sublist.

2. The method according to claim 1, additionally comprising the step of:

storing the retouched image.

3. The method according to claim 1, wherein said segments of said primary list of candidate defect segments comprise connected pixels.

4. The method according to claim 1, wherein said step of electronically processing said digital image data includes processing with a contrast box filter.

5. The method according to claim 1, wherein said step of displaying said image comprises the steps of:

dividing said image into several subimages; and displaying the subimages containing said sublist of defective segments in successive order.

6. The method according to claim 1, wherein said step of creating an amended sublist comprises modifying said pre-determined criteria to obtain said amended sublist.

7. A method according to claim 6 wherein said step of choosing comprises the step of an operator modifying said criteria.

8. A method according to claim 6 wherein said step of amending further comprises the step of automatically retouching said final list of declared defect segments.

9. The method according to claim 1, wherein said step of creating an amended sublist comprises selecting negative mask areas and excluding candidate defect segments in said negative mask areas from said sublist.

10. The method according to claim 1, wherein said step of creating an amended sublist comprises selecting positive mask areas and including candidate defect segments in said positive mask areas in said sublist.

11. The method according to claim 10, wherein said step of processing the digital image is performed a second time during the said step of selecting positive mask areas.

12. The method according to claim 1, wherein said step of creating an amended sublist further comprises performing further electronic processing and adding new candidate defect segments to said amended sublist.

13. The method according to claim 1, wherein said step of retouching includes automatically retouching said data from said amended sublist of defect segments.

14. The method according to claim 13, wherein said step of automatically retouching comprises the step of correcting the values of pixels within said defect segment using the values of pixels from said image data surrounding said defect segment.

15. The method according to claim 13, wherein said step of automatically retouching comprises the steps of:

performing a first retouching after said sublist selecting step;

storing the resulting initial retouched image; and performing a second retouching step after a final amended sublist of defect segments has been created.

16. The method according to claim 15, wherein said second retouching step comprises retouching the segments on both said sublist and said final amended sublist by copying corresponding retouched areas from said stored initial retouched image.

17. The method according to claim 13 wherein said step of retouching comprises the step of changing the values of pixels within said defect segment with the values of pixels from the segments of said image surrounding said defect segment.

18. The method according to claim 1, wherein said step of processing the digital image is performed using morphological methods.

19. The method according to claim 1, wherein said step of processing the digital image is performed for either light segments on a dark background, dark segment son a light background or both light and dark segments on a dark or light background respectively.

20. Apparatus for retouching of digital images, comprising:

electronic processing means for processing said digitally stored image to obtain at least one list of candidate defect segments;

means for computing the statistics of said candidate defect segments and segments of the image surrounding said candidate defect segments;

storage means coupled to said processing means for storing said digital image and said at least one list; and display apparatus coupled to said processing means for displaying the stored image and said defect segments.

21. The apparatus according to claim 20, further comprising, a display buffer coupled to said display apparatus and to said processing means for storing said digital image and the pixels of said defect segments in a raster image form.

22. The apparatus according to claim 20, further comprising, interactive tools coupled to said processing means adapted for operator control of pre-determined criteria thresholds.

23. The apparatus according to claim 20, further comprising, masking tools coupled to said processing means adapted for operator control of positive and negative masking areas in said image.

24. The apparatus according to claim 20, further comprising, means for correcting the values of pixels within said defect segment using the values of pixels from the data of said image surrounding said defect segment.

* * * * *